United States Patent [19]

Weman et al.

[11] 4,004,751
[45] Jan. 25, 1977

[54] SAFETY BELT INERTIA RETRACTOR AND BACKING DEVICE

[75] Inventors: Per Olaf Weman, Haslah; Harald Martin Schmelow, Ederau, Krs. Segeberg, both of Germany

[73] Assignee: Sigmatex, A.G., Basel, Switzerland

[22] Filed: Nov. 25, 1974

[21] Appl. No.: 527,008

[30] Foreign Application Priority Data

June 21, 1974 Germany .................. 2429801

[52] U.S. Cl. ................................... 242/107.4 A
[51] Int. Cl.² ................................... B65H 75/48
[58] Field of Search ............ 242/107.4 R, 107.4 A, 242/107.4 B, 107.4 C, 107.7, 107.6; 297/386, 388

[56] References Cited

UNITED STATES PATENTS

| | | | |
|---|---|---|---|
| 3,510,085 | 5/1970 | Stoffel | 242/107.4 B |
| 3,779,479 | 12/1973 | Lindblad | 242/107.4 B |
| 3,881,667 | 5/1975 | Tandetzke | 242/107.4 A |

Primary Examiner—Leonard D. Christian
Attorney, Agent, or Firm—Ernest D. Buff; Jonathan Plaut

[57] ABSTRACT

A belt winder with a quick-locking vehicle inertia sensitive action comprising an inert mass actuated to lock the belt winder shaft when the vehicle is accelerated and which can be brought into operative position in any mounting position in space.

15 Claims, 22 Drawing Figures

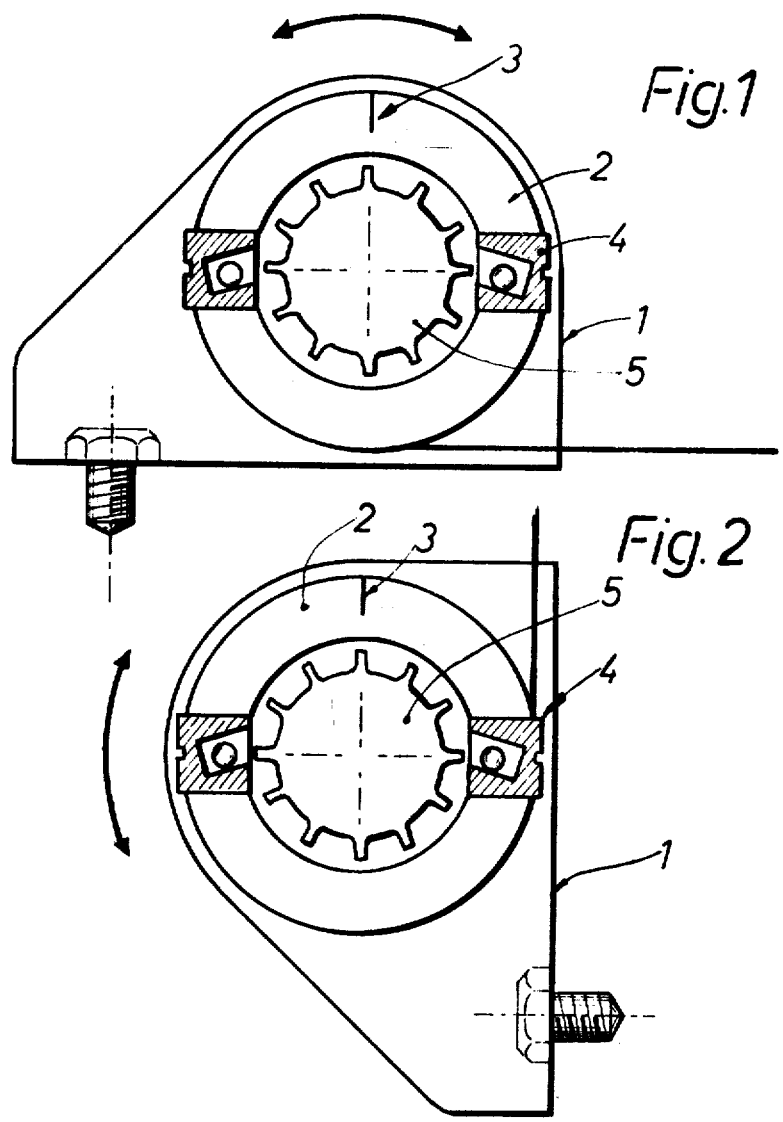

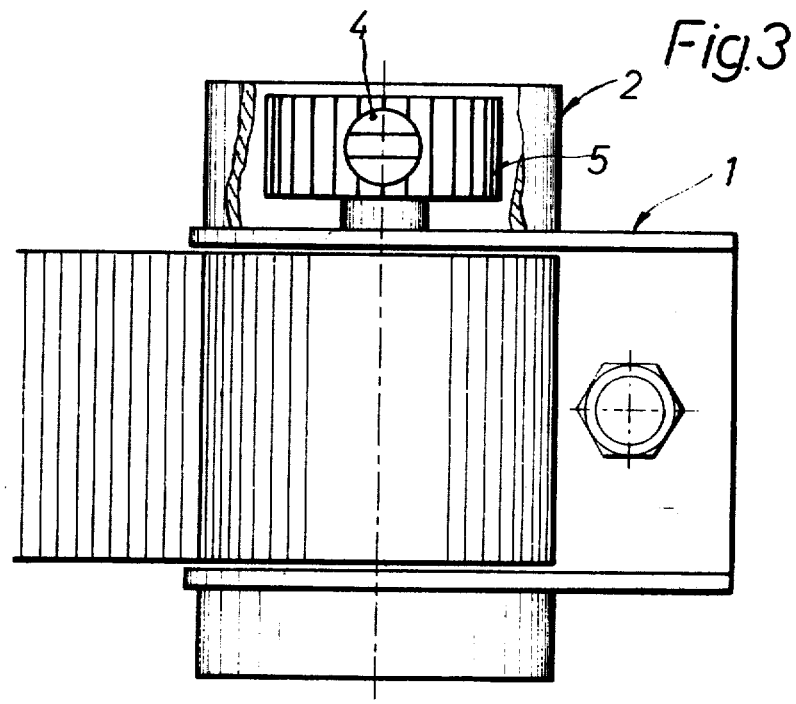
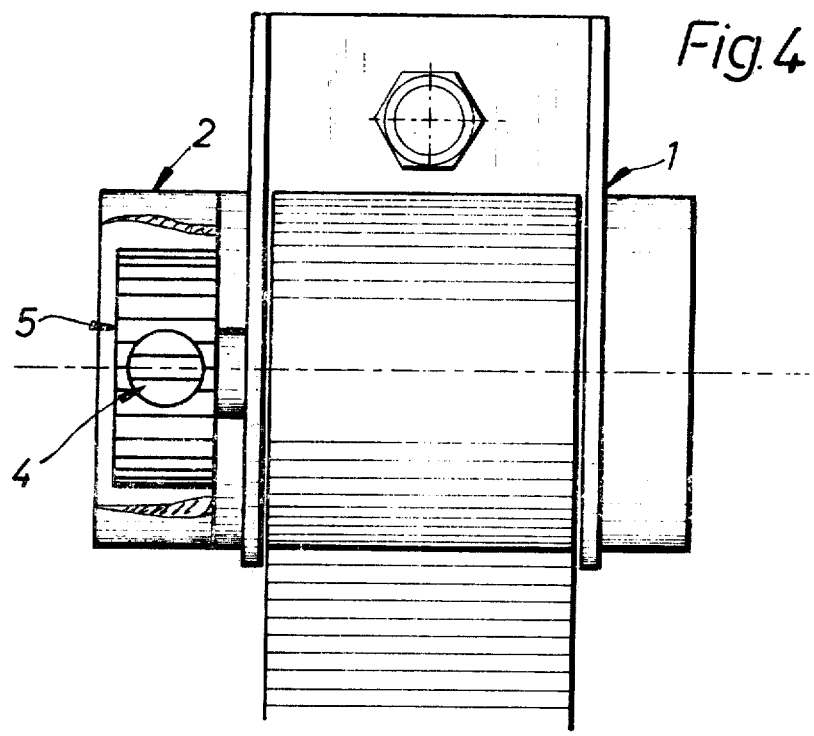

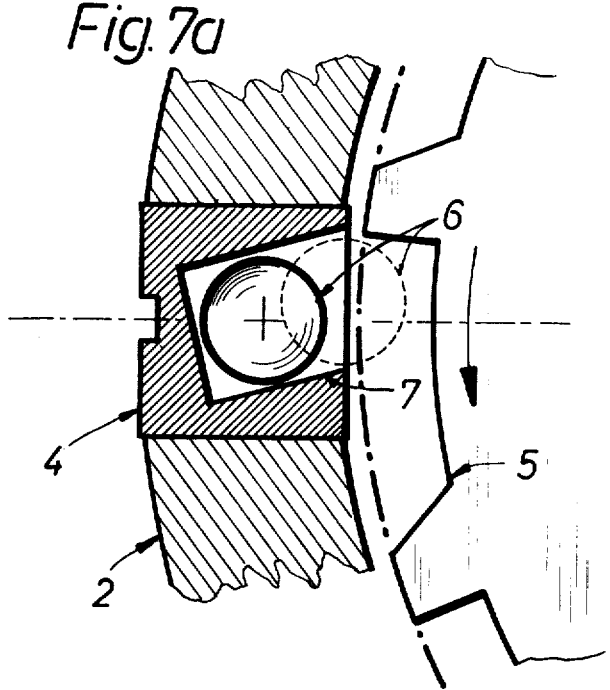
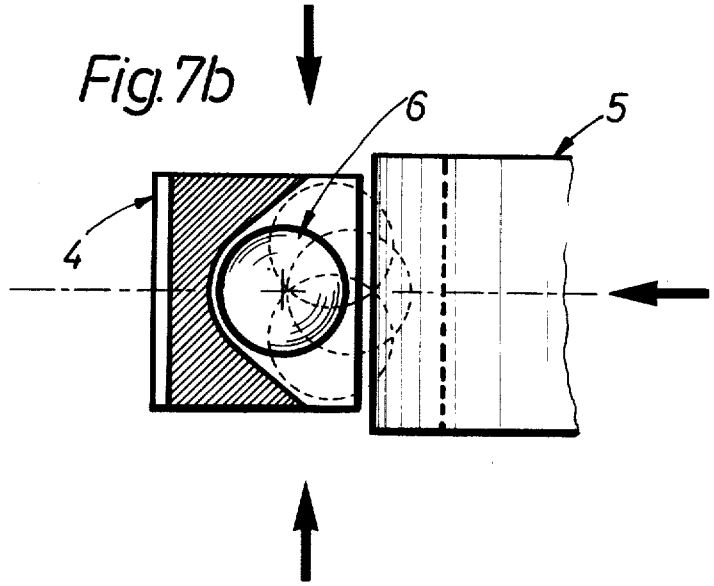

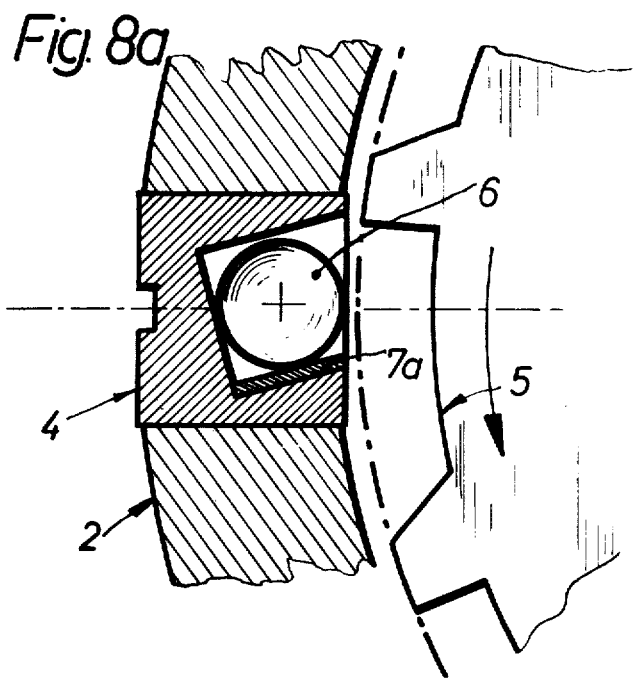
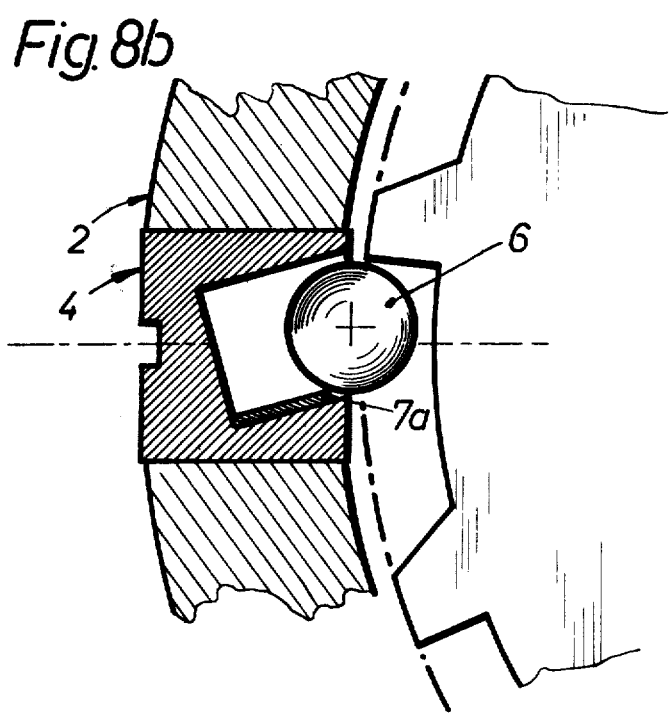

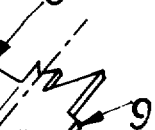
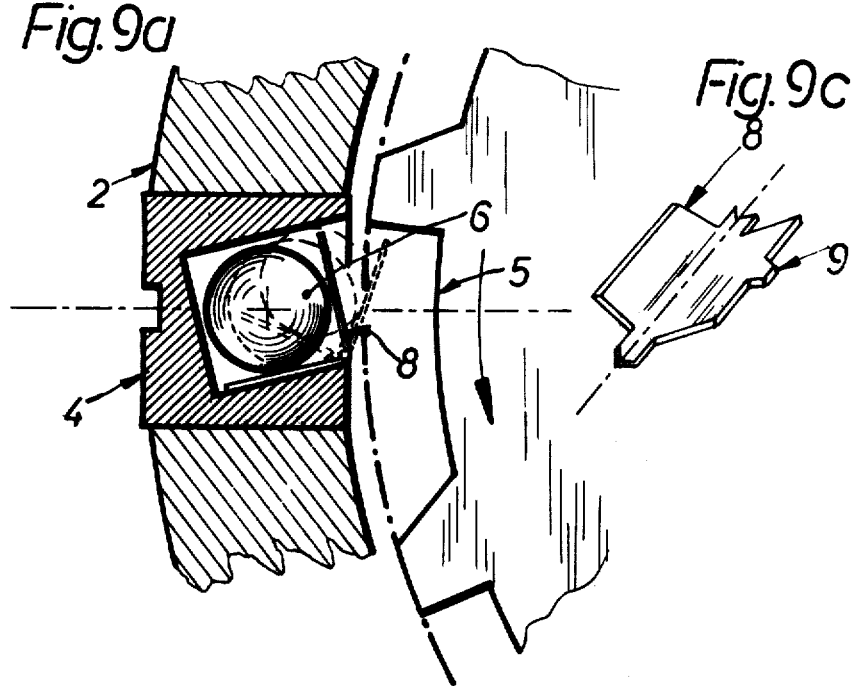
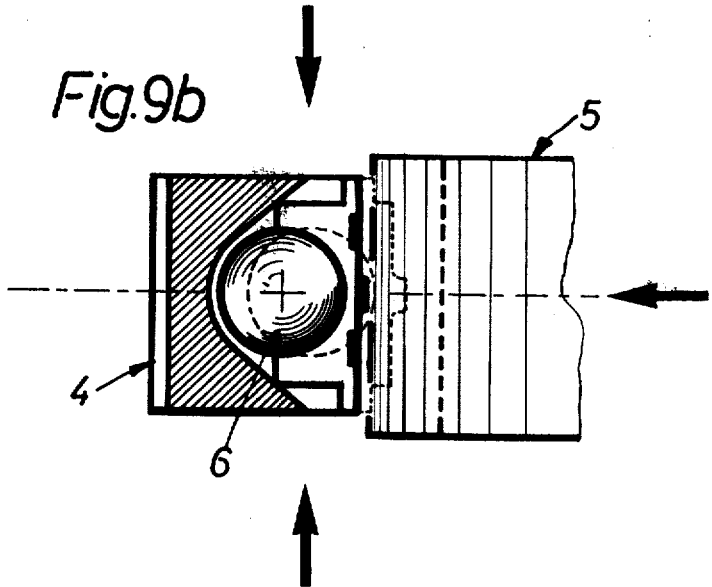

(A-A)

(A - A)

SAFETY BELT INERTIA RETRACTOR AND BACKING DEVICE

The invention relates to a belt winder for vehicles with quick-action locking means, comprising a locking mechanism arranged between the housing of the winder and a winding shaft for the safety belt, and further comprising an inert mass which is mounted in a pocket, open at one side, in a mounting support and which triggers off or brings about the locking action when the vehicle accelerates in at least one of the three directions in space.

Various belt winders with locking means are known — also known as retractors or automatic winders — in which the inert mass is either a pawl, a pendulum or a ball. Centrifugal force brings the pawl or ball into engagement with a circular locking member, where there are two alternatives: either, in the case of direct locking, the entire braking force is passed through the inert mass and the locking member; or, in the case of indirect locking, a force is passed through the inert mass at least to brake either the locking member in the form of a wheel, or the member holding the inert mass. It is also known for the inert mass to be mounted so that it can move in two — and in a few constructions even in three — directions in space. Thus, a blocking or locking action will either be triggered off by the movement of the inert mass relative to the pocket holding it, or will be brought about by the action of the inert mass itself.

In some winders these types of locking means, which respond to impact, in one of the three directions in space, with the vehicle carrying the winder, are provided in addition to types of locking means which respond to rapid unwinding of the safety belt.

For example, a quick-locking winder of the above type is known, wherein a release mechanism with a ratchet wheel (Schaltrad) is provided with a braking device. The ratchet-wheel is coupled to the locking mechanism with limited slip and, braked both by the inertia of the ratchet-wheel when there is abrupt pulling on the safety belt and also by the braking device triggered off by a pendulum when the vehicle accelerates in any direction in space, locks the locking mechanism even when there is slow pulling. In this known winder the locking means comprises a toothed segment, which is mounted eccentrically on a disc fixed to the winding shaft for the safety belt, which can turn in a toothed rim fixed to the housing and which can be pivoted into engagement with the toothed rim in order to lock the winding shaft. When there is relative movement between the above-mentioned ratchet-wheel and the disc fixed to the winding shaft, in the direction in which the belt is unwound, the ratchet engages in the toothed rim and, bearing against it, pivots the toothed segment to engage in the rim. The special feature of this known apparatus is the Cardan suspension of a counter weight at its center of gravity, in which the actual pendulum is mounted. This is intended to compensate for the effect of transverse and longitudinal inclinations of the vehicle.

A disadvantage of the known winder is that the compensating effect just mentioned can only take place to a certain extent, in practice up to a pivoting angle of about 5° to 10°. Another disadvantage is that the known apparatus has to be arranged so that the hollow shaft lying along the main axis of the winder, around which the safety belt is wound, is parallel with the longitudinal axis of the vehicle. This makes it quite difficult to fit the winder in some types of vehicle.

In the design of new types of bodies for vehicles the tendency is to depart more and more from the square box shape. There is thus a demand for belt winders to be mounted on inclined parts of a vehicle.

The possibility of arranging the winder in the backrest of the vehicle has also been considered.

It is obviously not always possible or desirable to fix the winder to a horizontal or verticle plane in the vehicle. Not only at the door lintel, probably the commonest place for mounting winders, but also at the edge of the chassis floor there are inclined surfaces and curves where a winder could theoretically be fixed provided that it could operate in the inclined position involved. The known safety belt winder, described at the beginning in which the hollow shaft has to be parallel with the longitudinal axis of the vehicle, although it allows for adjustment in a plane determined by the installation of the winder, does not allow for any adjustment in other planes.

The aim of the invention is therefore to improve the belt winder of the type mentioned at the beginning, so that it is strong and simple in construction and can be arranged in any position in space.

According to the invention this is achieved, in that the mounting support with the pocket, open at one side, for the inert mass, is in the form of an adjusting cylinder, which is arranged in a ring mount so that it can rotate about its longitudinal axis and be arrested, the ring mount being adapted to rotate about an axis perpendicular to the longitudinal axis of the adjusting cylinder, and to be arrested. The great advantage of the measures taken by the invention is that the new safety belt winder can be mounted at any inclination to the vertical, without any parts of the winder having to be replaced or exchanged. Hence, the apparatus according to the invention can be adapted without difficulty to the conditions in any vehicle. For the manufacturer this has a considerable economic advantage, since a single product can be made in large quantities and installed in many different types of vehicle and body designs without any special models having to be made. As the winder can be used without alteration in all types of vehicles, e.g. in the motor vehicle and aircraft industry, the manufacturer of this mass produced article obviously has cost advantages which are by no means inconsiderable. Even if there are different regulations as to responding sensitivity in another country - and regulations are known to vary often from country to country at present - even slight variations can produce the desired adaptation without the whole design being changed. This will be further explained below.

In practice the handling of the belt winder according to the invention means that one must always put the above-mentioned longitudinal axis of the adjusting cylinder into a horizontal plane, regardless of the mounting position. If this has been done (a) by turning the ring mount and (b) by turning the adjusting cylinder in the ring mount, then the requisite responding conditions will obtain for the winder, pre-adapted to the regulations of the country in question. Use of the adjustability provided by the invention thus means that, for any vehicle manufacturer, the winder according to the invention only has to be adjusted once — and this might be done by the manufacturer of the winder — after which the winder can be installed in the desired type of vehicle without any further changes. The manufacturer has the considerable advantage of not having to store different spares or exchange parts for different types of vehicle.

In accordance with the invention it is desirable to have two adjusting cylinders arranged in the ring mount, in axial alignment with one another and so that they can be turned and blocked. The open ends of the individual pockets preferably face towards one another. The above-mentioned longitudinal axis of the adjusting cylinder then obviously extends in one line with the longitudinal axis of the other adjusting cylinder. In this embodiment the adjusting cylinder itself and thus the internal pocket and the inert mass may be particularly simple in construction. The adjusting cylinder is inserted in the ring mount like a kind of stopper. It could equally be termed a sensing or locking cylinder. However, its most important function is adjustment, i.e. turning the adjusting cylinder or cylinders about the said longitudinal axis, which may be the line joining the two cylinders, in order to set the axis at 90° to the vertical and so achieve optimum operation of the winder. As already mentioned above, it is not sufficient to set merely the axis, i.e. one line, perpendicularly to the vertical, for any number of planes might extend through the line. Instead, if the winder is to be difinitively adjusted, the ring mount must be turned until the plane defined by the said longitudinal axis through the adjusting cylinder and the axis perpendicular to the plane of the ring mount is set horizontally, i.e. at 90° to the vertical.

It is advantageous, according to the invention, for the adjusting cylinder to be pressed in by means of a snap ring or to be fitted into the ring mount with a press fit. Should a special construction be required for the pocket inside the cylinder, in accordance with the regulations of the country in question, then the adjusting cylinder — the only part of the entire winder — may be substituted by a cylinder with the same external dimensions but with a different pocket in the ring mount. Owing to the above-mentioned features of insertion or the press fit such mounting is extremely simple and takes up little working time.

In an advantageous development of the invention the inert mass is a ball. The inclined position of the pocket in the adjusting cylinder, i.e. the position at an angle to the horizontal, is a very simple way of forming a kind of slope over which the inert mass, i.e. the ball, can pass merely on receiving a blow or other acceleration. This type of solution indicates the simplicity of the embodiment.

In another, desirable embodiment of the invention the inert mass, as seen in plan, is a body which is rounded on one side and which preferably has a projection at the side opposite the rounded part. The rounding of the inert mass is an advantageous way of distributing the bearing pressures, e.g. when the mass collides with the locking wheel. The reaction forces are then evenly distributed over the bottom of the pocket, so that there is no wear and both the inert mass and the adjusting cylinder are less or not at all in danger of being damaged. This increases the reliability and operating safety of the apparatus. Whatever inclined position the adjusting cylinder has, whether horizontal, vertical or the like, the projection can advantageously always guarantee that there will be the same contact surface between the locking wheel and the inert mass. Thus the projection acts as a small contact surface, always ensuring that locking can take place. In each position in space relative to the locking wheel, it is smaller than the distance between the teeth.

In this embodiment, with the member flat at the top and bottom and rounded at the side associated with the rear side of the pocket, there is surface contact instead of punctiform contact in the case of the ball. It will be appreciated that this improves the distribution of pressure between the inert mass and the adjusting cylinder when blocking takes place. A further reduction in friction can be achieved by making the inert member of a low friction material such as tetrafluoroethylene or by coating the member with such material.

The projection which may be arranged at the side opposite the rounded part serves to offer the locking wheel the same contact surface.

It is further advantageous, according to the invention, for the inert member to have an opening in its underside to receive a ball. This embodiment follows on from the construction with the inert mass as a non-circular body. Until the locked state is reached the inert member can easily roll. When blocking takes place the member tips and transmits the locking forces to its top and underside and to the top of its rear edge, so that better pressure distribution is achieved than when the inert mass is a ball.

Another embodiment of the invention may also be desirable, in which the locking wheel is hollow and carries the teeth on the inside. The adjusting cylinder or cylinders are then arranged centrally at a spacing from the rotating locking wheel. The adjusting cylinder is preferably stationary or fixed to the housing, with the pockets to receive the inert members arranged on opposite sides. The open end of the pocket is then arranged the opposite way from that of the opposed pocket. This embodiment differs from the other, in which the open ends of the pockets face towards one another. In the case of the hollow locking wheel the distance between its teeth and the pockets in the adjusting cylinder will naturally be such that, on sudden acceleration and thus movement of the inert mass, the mass will immediately come into engagement with the teeth in the desired manner and trigger off or bring about the locking action.

Another interesting and desirable embodiment is that in which the adjusting cylinders do not lie in the same plane as the locking wheel. This expressly applies to both embodiments, whether the locking wheel engages around the adjusting cylinder or cylinders or whether the cylinder or cylinders are arranged at a spacing outside the locking wheel. Engagement between the inert member and the teeth on the wheel is then brought about by a hinged lever which transmits the engaging force.

It may be desirable to provide only one adjusting cylinder in the ring mount instead of two. In that case a sensor, responding means or inert mass must be provided in the pocket of the cylinder to cause the winder to be blocked should the vehicle acelerate in any direction in space. A particularly preferred embodiment of the invention therefore provides for the inert mass to be a pendulum. Pendulums are already known per se as initiating means. What is novel and surprising is the idea that such a pendulum can be arranged and can function even in the relatively small adjusting cylinder. The result achieved with such a construction is that only one adjusting cylinder is necessary.

The same advantage is obtained in a different embodiment of the invention if the inert mass is a carriage mounted on rollers. The carriage is none other than an inert member which may be round or of any other shape and which is mounted on at least one roller for better mobility in the pocket in the cylinder. The most desirable arrangement would be with two cylindrical rollers, although the provision of three balls is also advantageous. A great many ball-bearing arrangements can be imagined.

In the embodiment just described, with the inert mass in the form of a carriage mounted on rollers or balls, it is favorable according to the invention, for the top of the carriage to contain a funnel-shaped opening, in which a locking pin mounted on a locking lever is arranged so that it can be displaced relative to the opening, and for the locking lever to be pivotable about an axis perpendicular to the axis of the adjusting cylinder. The carriage will be at right angles to the vertical, through the adjustment of the winder described above, consisting of turning both the ring mount and the adjusting cylinders. The slightest movement of the carriage in that plane, brought about, e.g. by impact with or acceleration of the vehicle from the side or front, makes the locking pin slide upwardly in the funnel-shaped opening, guided by the surfaces thereof, whereby the locking lever can be displaced and thus brought into engagement with a locking device, e.g. a locking wheel.

From the remarks made about the above advantages and embodiments of the invention, it will be realized that probably the most suitable type of locking member is a wheel with teeth at the periphery, acting as the opposed member for the positive connection between the winder housing, by means of the ring mount and adjusting cylinder, and the locking wheel; the axis of the locking wheel coinciding with the main axis of the winder and the wheel itself being fixed to the main winding shaft. This obviously presupposes that the recesses between the teeth around the periphery of the wheel are spaced from one another at least by a distance equal to the maximum diameter of the inert mass or of the locking lever in a peripheral direction. In other words, one must always ensure that the inert mass, whether it be the ball, the member with flat portions, the member mounted on rollers or balls or the part lying in a peripheral direction and comprising components of the locking lever, has enough room to come into effective engagement with the locking wheel or the teeth thereon after being displaced. The embodiment described here, in which the axis of the locking wheel coincides with the main axis and the locking wheel is fixed to the main winding shaft, is suitable for so-called "direct locking", where the locking force is absorbed directly by the inert mass and the teeth on the locking wheel.

Another embodiment is characterized in that the axis of the locking wheel does coincide with the main axis of the winder but the locking wheel can turn only up to a limited deflection relative to the main winding shaft. This embodiment is appropriate for indirect locking, where the deflection of the locking wheel only triggers off the actual arresting process in a manner known from other apparatus.

In accordance with the invention it is particularly advantageous for the pocket in the adjusting cylinder to be substantially angular in one plane. This shape can be changed with simple tools and without using a large amount of material - particularly because of the smallness of the cylinder - should the required sensitivity regulations in other countries require different guidance for the inert mass, i.e. a different slope. In other words, by inserting a different adjusting cylinder, like inserting a different stopper, allowance can be made for the regulations in different countries and thus for a different response, through giving the new adjusting cylinders differently designed pockets. If the national regulations do not vary too much, it may be unnecessary to exchange the cylinders for others with differently shaped pockets, since the design gives responding results which are within the admissible tolerances.

In particular the tolerance will compensate for the following displacement under the regulations obtaining in one and the same country.

Mention was made above of an adjusting cylinder axis and of the ring mount axis, perpendicular thereto, the winder according to the invention being displaceable about these two axes in order to set it. The position concerning the third axis, perpendicular to the two above axes, has not yet been mentioned. This is an axis which is always vertical. This is not essential to an explanation of the invention and so has not been emphasized, but for the sake of completeness it should be mentioned that the winder is always arranged at a certain angle about the vertical. What size the angle is here is of course immaterial, since the invention function of triggering off or moving the inert mass does not depend on the angle about the vertical at which the plane defined by the two other, first-mentioned axes, is turned.

What must of course be compensated for is a slight variation in the height of the slope offered in each case to the inert mass. This is because angles and different components for the inert mass apply should the apparatus receive an impulse from the same lateral direction, when the winder is installed turned at this or that angle about the vertical axis. As already mentioned, the admissible tolerances compensate for this, as has been found in practice in the past.

In an advantageous form of the invention the adjusting cylinder is made of a pressure-resistant, resilient material. In other embodiments it is made of metal. Selection of the resilient material, such as plastics or rubber, results in a springing-back action when locking takes place, so that the forces acting on the tip of the tooth on the wheel are advantageously reduced. In addition, when the tooth has been relieved resilient forces arise and move the wheel so that unlocking definitely takes place.

It is further desirable for the adjusting cylinder to have an external slot to receive a screw-driver. This clearly simplifies and facilitates the setting process.

If, in the special embodiment, the inert member is arranged in a trap, which is hinged externally to the bottom of the adjusting cylinder and which has two side faces approximately at right angles to one another, the apparatus will be suitable for "indirect locking". In this embodiment the locking wheel can then be in the form of a relatively thin disc. As a result of the elongation of the active arm a substantially shorter displacement of the inert mass will be sufficient to make it catch in the teeth on the wheel. In this construction it is further regarded as advantageous to provide a projection, preferably made of hardened steel, at the exposed end of the external side face of the trap. A ball as such rolls easily and, by making the projection of the size described above (smaller than the gaps between teeth), one can advantageously obtain an easily reproducible, accurate locking action when the ball comes into engagement with the wheel. The hard tip, made e.g. of hardened steel, has been found desirable for embodiments where, owing to the constant play between locking and unlocking, abrasion at the exposed end of the external side face of the flap would have led to damage or unreliable operation.

As a means of further facilitating the setting of the winder it is desirable, according to the invention, to provide a mark on the ring mount. The mechanic in the factory need then only place one mark on the other, by turning the ring mount by hand or with a tool, depending on the type of tool and the construction of the bodywork, and a very precise setting will be obtained.

The simplicity in operating the invention and the simplicity of its construction guarantee good reliability and a cheap mass-produced article, where many different parameters for increasing or reducing the sensitivity of the sensor can be adjusted by exchanging very small components.

Other advantages, features and applications of the invention will become apparent from the description which follows; this refers to the accompanying drawings, in which:

FIG. 1 is a side elevation of a first embodiment of the invention with a ring mount and two adjusting cylinders.

FIG. 2 is the same view as FIG. 1 but with the winder turned through 90° to the left.

FIG. 3 is a plan view of the winder with the ring mount shown broken away.

FIG. 4 is a similar view to FIG. 3 but with the apparatus turned anti-clockwise through 90°.

FIG. 7a is a section through part of the embodiment, similar to FIG. 1 but showing only the left hand adjusting cylinder.

FIG. 7b is a sectional view along a plane defined by the adjusting cylinder axis $a-a$ in the direction of the main axis of the winder.

FIG. 8a is a view similar to FIG. 7a but of a different embodiment, with the bottom of the pocket lined.

FIG. 8b is the same view and embodiment as FIG. 8a but with the inert mass, in the form of a ball, shown in the locking position.

FIG. 9a is a view similar to that of FIG. 8a of a different embodiment with a trap.

FIG. 9b is a perspective view of a special embodiment of the trap.

FIG. 9c is a sectional view along a plane located as in FIG. 7b.

FIG. 10b is a sectional view along the line A—A in FIG. 10a.

FIG. 11b is a sectional view along the line A—A in FIG. 11a.

Figure 5:
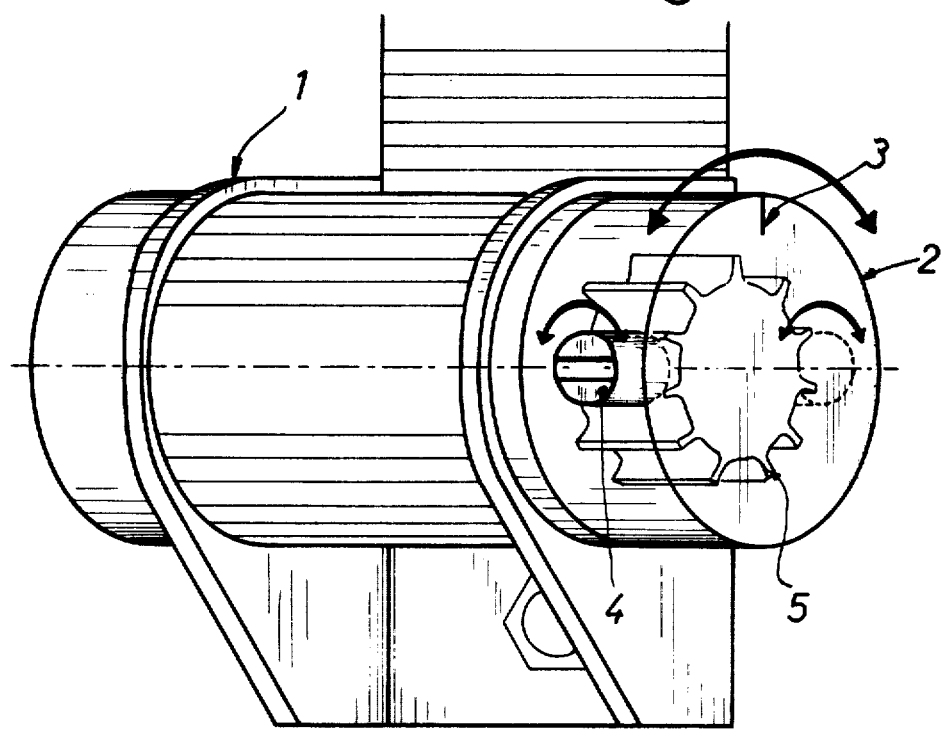
FIG. 5 is a perspective view showing the possible arrangement on a substantially vertical fixing part.

FIGS. 1 to 6 clearly show the shape of the housing 1 of a safety belt winder in the conventional form, wherein (FIGS. 3 to 6) the axis $c-c$ coincides with the main axis and thus with the main shaft of the winder, to which the belt strip is attached and about which it can be wound. As the invention is not concerned with the fastening and winding of the belt strip on the main shaft, the torsion spring for biasing the main shaft in the winding-up direction or other details of the blocking means, e.g. for when the belt strip is pulled out at an acceleration which exceeds a predetermined value, whereby a different locking mechanism might come into action, these components will not be described here.

The mounting support 2 is in the shape of a ring as can be seen clearly from FIGS. 1, 2, 5 and 6. In FIGS. 3 and 4, the ring is shown in plan and is in fact cut away to give a better view of the components arranged concentrically therein. In this embodiment, the ring mount 2 is shown without any casing. A housing could of course be provided to cover it, but this is not essential to an explanation of the invention.

A mark 3, e.g. a notch, colour symbol or the like, is provided on the ring mount 2. The purpose of the mark is to give the mechanic easy and appropriate fitting instructions. The mechanic should preferably turn the ring mount 2, which is rotatable about its axis $c-c$, until (as shown in FIGS. 1, 2, 5 and 6) the line from the mark to the center of the ring mount 2 is at right angles with axis $a-a$ (FIGS. 1 and 2).

Adjusting cylinders 4 are inserted in opposite sides of the ring mount 2 with a snug fit. The outside of each cylinder 4 is provided with a slot to receive a screwdriver or the like. The cylinders are rotatable about the axis $a-a$. On the inside of the ring mount 2 the two adjusting cylinders 4 have pockets 30 with their open ends facing towards one another. In the side view shown in FIGS. 1 and 2 the pockets 30 are arranged at an angle to axis $a-a$. This angular arrangement provides a slope at the bottom of each pocket 30, at the open end, and the inert mass can only pass over this slope when a sufficiently great impulse is imparted to it. In the embodiment shown in FIGS. 1 to 9, the inert mass is a ball 6.

Inside and concentric with the ring mount 2 is a locking wheel 5 with teeth 31 at its periphery. Although the shape of the teeth varies in the examples shown it does not of itself make any difference; only the upper inclined surface in each of FIGS. 7a, 8, 9a, 10a, etc. as explained with reference to FIG. 7a (sic).

The only essential is that the recesses between the teeth 31 around the periphery of the locking wheel 5 should be spaced from one another at least by a distance equal to the maximum diameter of the ball 6 or differently shaped inert member or to the component of the locking member (to be described later) lying in a peripheral direction.

In FIGS. 1 and 2 it will be noted that the ring mount 2 is rotatable in the direction of the curved double arrow, about axis $c—c$, which extends perpendicularly to the axis $a—a$ of the adjusting cylinder and perpendicular to the plane of the paper in FIGS. 1 and 2. It will also be noted that, although the winder housing is swung from the FIG. 1 to the FIG. 2 position, axis $a—a$ is horizontal in both cases.

The same phenomenon is shown in FIGS. 3 and 4 with the adjusting cylinder 4. If the winder with the housing 1 is swung from the FIG. 3 arrangement into the FIG. 4 position, so that the main shaft $c—c$ is turned anti-clockwise through 90°, the same adjustment conditions for the locking device according to the invention can be obtained, by turning the adjusting cylinder (which is on the opposite side, out of sight) clockwise through 90°. In the pivoting movement shown in FIGS. 3 and 4 the axis $a—a$ of the adjusting cylinder remains at right angles to the plane of the paper in both positions.

For the same of simplicity, we shall first take the case of "direct locking", with the locking wheel 5 rigidly mounted on the main shaft of the winder, located on the line of the axis $c—c$.

FIG. 5 is a perspective view, to make the action clearer, and again shows how the ring mount 2 and the adjusting cylinder 4 each turn. The large, curved double arrow should be thought of as being arranged transversely to the two small, curved double arrows, for the ring mount 2 is rotatable about the axis $c—c$ while the two adjusting cylinders 4 are rotatable about the axis $a—a$ perpendicular thereto. In the FIG. 5 arrangement one can imagine the belt winer mounted on the vertical side wall or the vertical door lintel of the vehicle.

Figure 6:
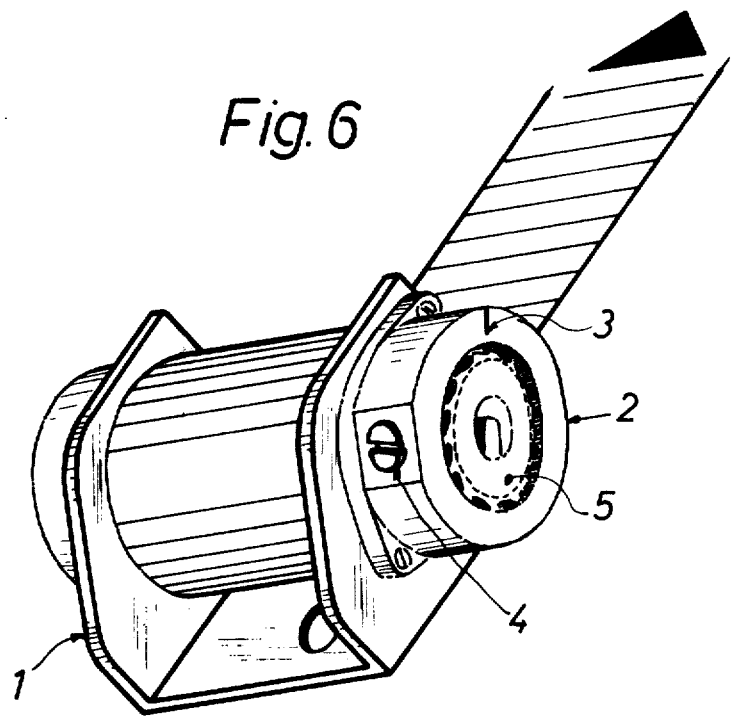
FIG. 6 is a perspective view showing the possible arrangement in a skew position.

FIG. 6 is designed to show the skew position of the winder with the housing 1 in which, despite the angular arrangement, the plane of the sensor is kept vertical in each of the three directions of space. This is achieved firstly by setting mark 3 as described above — pointing to the vertical — through turning the ring mount 2 about the axis $c—c$, and then by turning the two adjusting cylinders 4 e.g. until the slot, acting as a marker, shows the plane defined by the slot and the cylinder axis $a—a$ to be horizontal. The pockets in the adjusting cylinders are then arranged so that impact with the vehicle from any direction will cause the inert member, particularly the ball, to be pushed out of one or other of the opposing cylinders 4.

In FIG. 6 one can imagine the belt winding means as being screwed at the rear to the floor of the vehicle at an inclined part of the body.

We have so far only mentioned the possibility of adjustment and the means for obtaining the desired adjustment. We shall now describe the possibility of a locking action with reference to the above and other embodiments.

The trough-like shape of the pocket 30 can be seen from FIGS. 7a and 7b. The ball in it, which constitutes the inert mass, has the opportunity either to move laterally out of the rounded part of the pocket 30 or to move out perpendicularly over the slope in the direction of the axis $a—a$ and to arrive in the recess between the teeth on the locking wheel 5. The right hand, dotted line position of the ball 6 is an example of a position which it can assume after a blow from the right. The arrangement is such that the ball 6 either only enters the recess between the teeth as far as its center of gravity, so that it drops back automatically into the pocket when relieved of the load, or such that the ball is pushed back into the pocket by the oblique upper flank of the tooth in question when the locking wheel 5 is wound back by the action of the usual spiral spring (for biasing the belt strip in the winding direction); this might be provided for by raising the base between the teeth 31 on the wheel 5. In any case provision is made for the ball on return to its inoperative position in the pocket 6 after the locking process, either by gravity, buy an impulse or by turning.

When the ball 6 is in the position shown in broken lines in FIGS. 7a and 7b it is impossible for the teeth to turn any further anti-clockwise, i.e. down past the adjusting cylinder 4. In the case of direct locking the force is dissipated from the external tip of the tooth on the wheel 5, through the ball, the blocked or arrested (or possibly even fused) adjusting cylinder 4 and the ring mount 2 to the housing. A special embodiment, for example, is based on the idea that once the ring mount and adjusting cylinder have been adjusted both should be definitively secured by driving in a pin. This can be done when the winding means has been mounted on the floor of the vehicle or on the body, since the user of the vehicle will hardly remove the winding means himself.

In FIG. 7b the right hand arrow pointing to the left, shows the direction of an impact which would make the ball 6 move into the dotted line position along the axis $a—a$. The two arrows at right angles thereto show the directions of impact which would shift the ball 6 into the other two broken line positions.

The embodiment in FIGS. 8a and 8b differs from that in FIGS. 7a and 7b only in having the bottom of the pocket in the adjusting cylinder 4 covered with a rubber lining 7a. This measure is preferred if the ball 6 needs to be held in position better. It is also possible for the ball itself to be made of a pressure resistant, resilient material such as rubber, because there is then less strain on the components which transfer the force.

In the other embodiment shown in FIG. 9a (also FIG. 9c) the ball 6 rests in a trap 8 shown in FIG. 9b. The trap is fixed rotatably in the adjusting cylinder, e.g. by snapping the axial projections into marginal portions of the ring mount 2 or of the pocket. A blow on the housing 1 in the direction of the axis $a—a$ from the right in FIG. 9a causes the ball 6 to move into the dotted line osition. The trap thereby swings automatically about its center of rotation into the dotted line pivoted position. The projection 9 on the trap 8, preferably made of hardened steel, will then come into engagement with the next advancing tooth on the wheel 5 and block the wheel 5 at the slightest outward movement of the inert ball 6. The arrow pointing downwardly to the right represents the direction in which the belt is pulled out. However, this embodiment is particularly preferred for indirect locking, since the locking wheel 5 can then be in the form of a disc 2 to 3 mm thick and the trap 8 need not be exposed to over-great strains. Indirect locking means, briefly, that the braking of the wheel 5 triggers off the actual locking or blocking action only by actuating a locking mechanism.

Figure 10A:
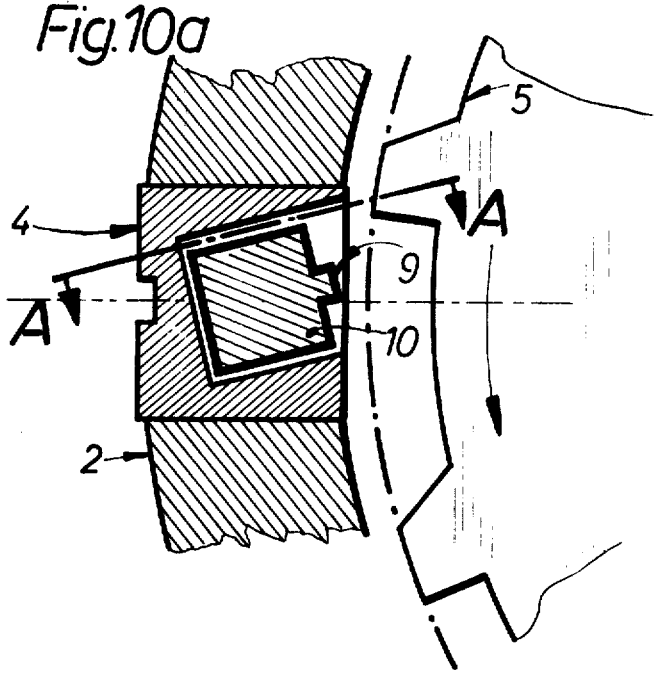
FIG. 10a is a sectional view through another, different embodiment with the inert mass in the form of a body which is flat on two sides.
Figure 10B:
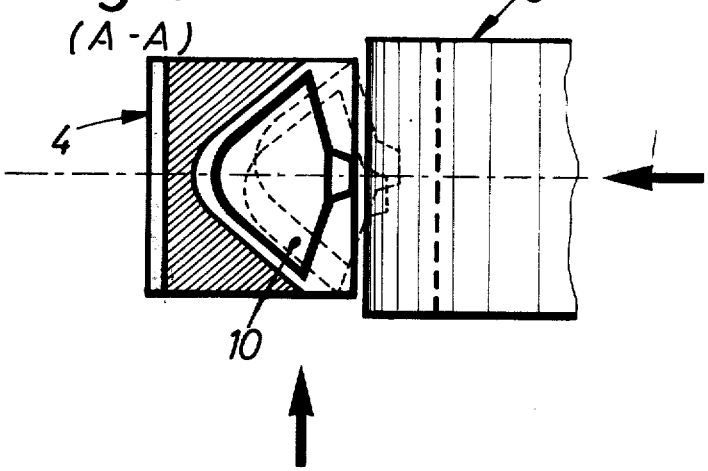

In FIGS. 10a and 10b the inert mass 10 is in the form of a body which is flat at the top and bottom and rounded at the rear side, facing toward the pocket 30 in the cylinder 4. The front, which is opposite the rounded side, again carries the projection 9. Forces acting in the direction of the arrows in FIG. 10b can bring the inert member 10 into one of the dotted line positions in FIG.

10b, in which, by means of projection 9, it comes into engagement with the front edges of the teeth on the wheel 5 when the belt is pulled further out in the direction of the part pointing downwards in FIG. 10a. The inertia member 10 should here preferably be made of a low friction material such as tetrafluoroethylene, or it should be coated with that material. The advantage of this embodiment lies in the reduction in friction, particularly if the inert member 10 makes surface rather than punctiform contact. This embodiment is particularly suitable for direct locking.

Figure 11A:
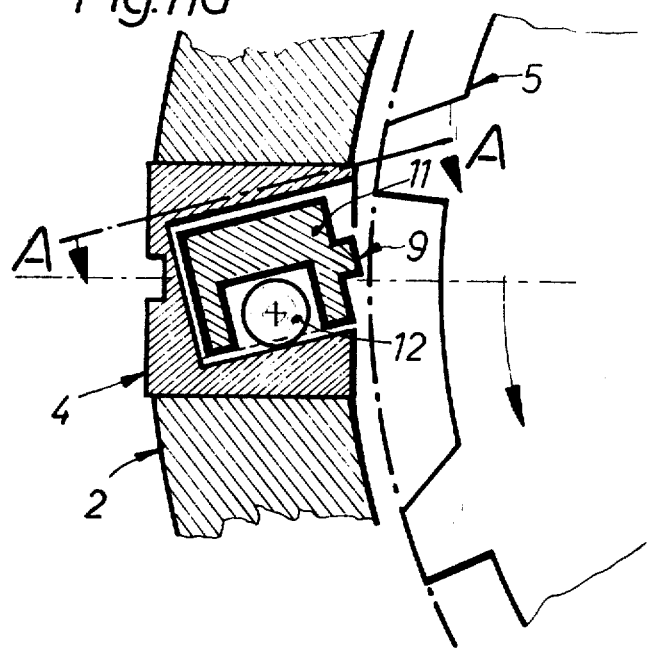
FIG. 11a is a similar view through another, different embodiment.
Figure 11B:
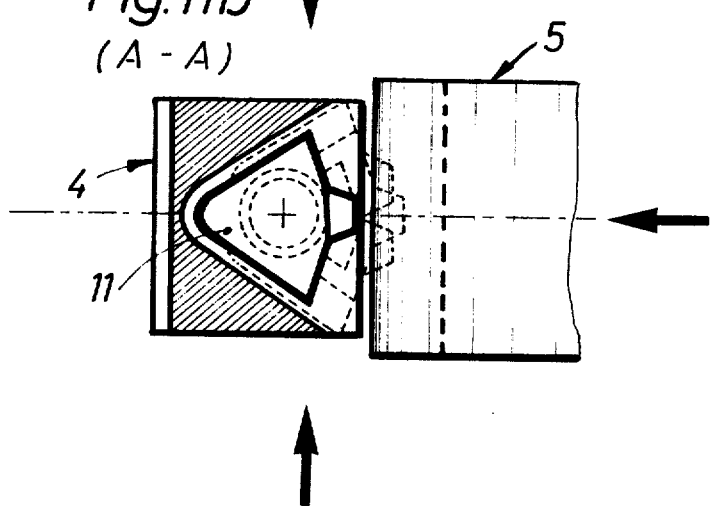

If one wishes to reduce friction in this embodiment, then one should make the inert member 11 as shown in FIGS. 11a and 11b. The inert member 11 with its projection 9 then has a recess in its underside to receive a ball 12. For example, the surface coating of polytetrafluoroethylene in the embodiment of the inert member 10 in FIGS. 10a and 10b may here be replaced by the ball 12. The arrows in FIG. 11b naturally show the directions of the forces which can bring the inert member 11 into the dotted line positions.

Figure 12:
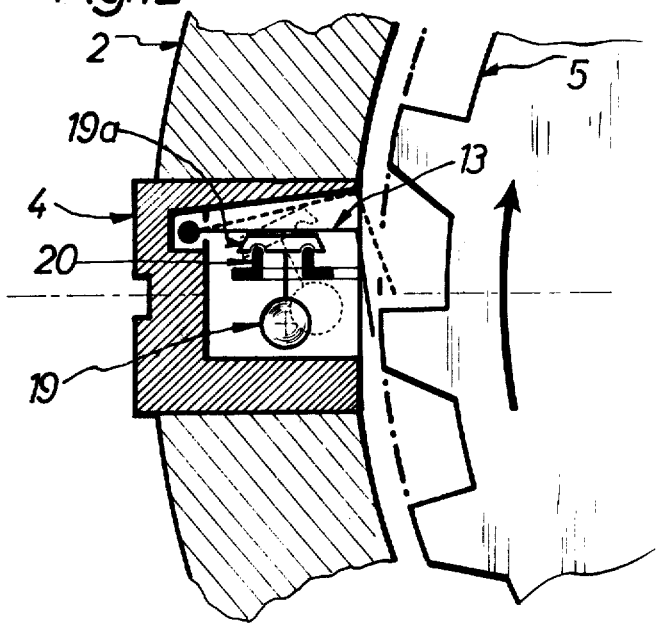
FIG. 12 is a sectional view through another, different embodiment, in which the inert mass is a pendulum and the locking action is brought about by a locking lever.
Figure 13:
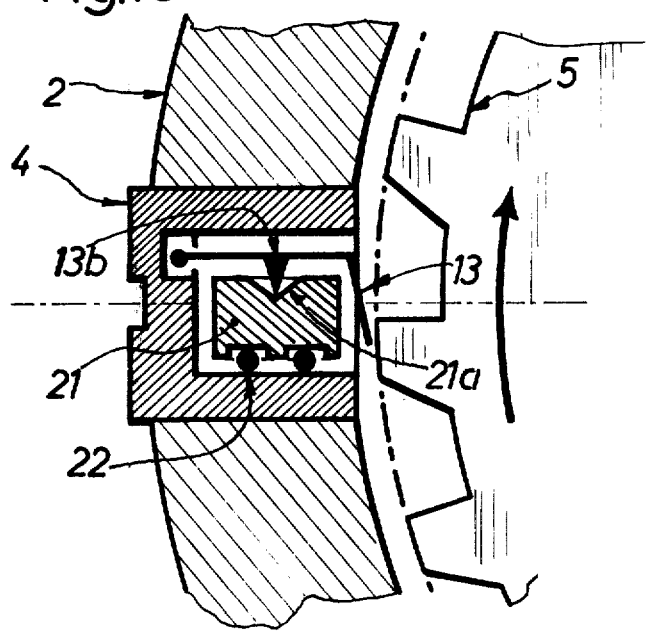
FIG. 13 is another, different embodiment of the invention with a carriage mounted on rollers and a locking lever.

Finally, the embodiments in FIGS. 12 and 13 show an arrangement where only 1 adjusting cylinder 4 is required in each case in the ring mount 2. The opposed adjusting cylinder can be left out because the pendulum 19 in FIG. 12 and the carriage 21 mounted on rollers 22 in FIG. 13 can move either to the right or to the left in the plane of the axis $a$—$a$. Improved mobility in directions perpendicular to or partly at an angle to the axis $a$—$a$ can be obtained in the FIG. 13 embodiment by using balls 22 instead of rollers 22.

In the FIG. 12 embodiment a blow from the right brings the pendulum into the dotted line position. The plate 19a, from which the pendulum hangs, is swung and tips the locking lever 13, hinged at the left, up into the dotted line position. Here the pulling out direction is upwards in the direction of the arrow, so that the part-component of the lever 13 which lies in the peripheral direction of the wheel 5 comes into engagement with the next upwardly approaching tooth on the wheel 5 and blocks the wheel. The force is absorbed not through the bearing 20 of the plate 19a for the pendulum 19 but by adjusting cylinder 4.

A similar effect occurs in the FIG. 13 embodiment, where the carriage 21 contains a funnel-shaped opening 21a in the top. The carriage will be taken to be moveable with only slight friction on three balls. A locking pin 13b is mounted on the lever 13 and located in the center of the funnel-shaped opening 21a in the carriage when in the inoperative position. A blow from the right, left, in front or behind or from an intermediate direction raises the locking pin 13b so that the lever 13 pivots upwardly about its pivoting axis $c'$ $c$—$c'$ $c$ and can come into engagement with the next upwardly approaching tooth on the locking wheel 5.

Figure 14:
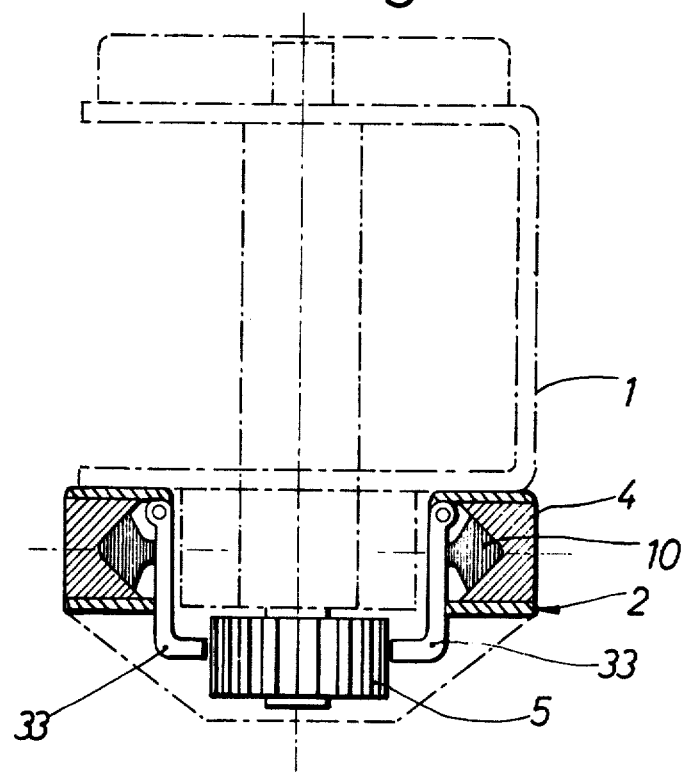
FIG. 14 is a different embodiment of the winder according the the invention, in which the ring mount and thus the adjusting cylinder are off-set from one another instead of being in the same plane as the locking wheel.

In the embodiment where the ring mount 2 with the two inserted adjusting cylinders 4 does not lie in the same plane as the locking wheel 5, two levers 33 are provided as shown in FIG. 14. The swivel pins for the levers 33 are shown in the central part of the Figures. If the inert member 10 moves to the left out of the pocket in the right hand adjusting cylinder 4, this force will automatically be transmitted to the right hand lever 33, and the angled front left hand end of the lever will immediately engage one or more teeth on the locking wheel 5. The action with transmission through the lever 33 is the same in FIG. 14 as in the other embodiments where the ring mount 2 with the cylinder 4 lie in the same plane as the wheel 5. When the inert member 10 shown at the left hand side of FIG. 14 moves outwardly to the right, the same locking action obviously takes place with the left hand lever 33.

Figure 15:
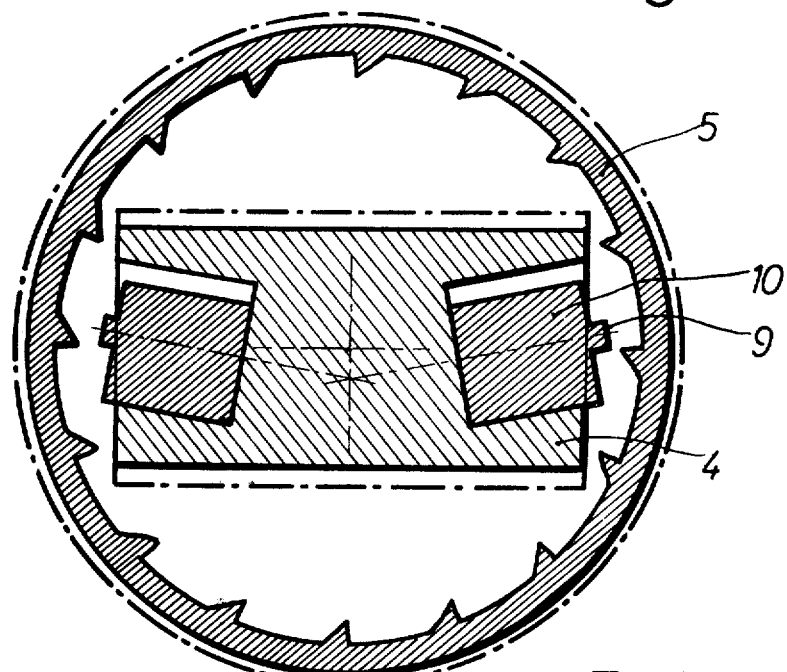
FIG. 15 shows another, different embodiment of the invention, in which the locking wheel is hollow with internal teeth and the adjusting cylinder is arranged inside the two opposing inert members.

In the embodiment shown in FIGS. 14 and 15 the locking wheel 5 is in the form of the hollow wheel with teeth projecting inwardly. The open ends of the pockets in the internally arranged adjusting cylinder 4 are located an approximately small distance from the internal periphery of the tips of the teeth. The open pockets can be seen to lie on opposite sides. Thus, as far as the arrangement of the pockets in the cylinder 4 is concerned, this embodiment is the exact opposite of the one in which the open ends of the pockets face towards one another.

Figure 16:
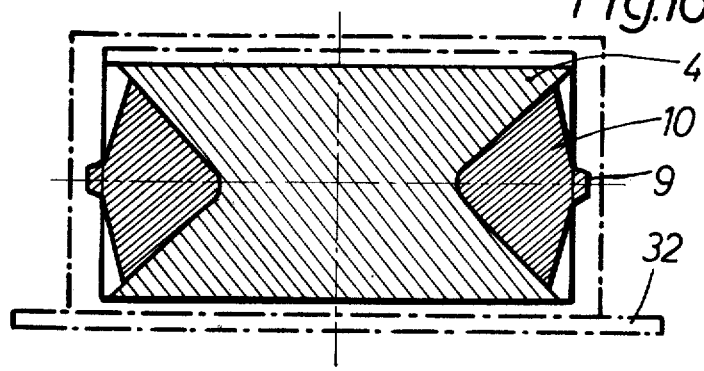
FIG. 16 is a section through the FIG. 15 embodiment, again showing the flat shape of the inert members.

The plate 32 in FIG. 16 also forms the end cover for the housing.

We claim:

1. A belt winder for a safety belt for vehicles with quick-action locking means, comprising a housing, a winding shaft for the safety belt, a locking mechanism arranged between the housing and the winding shaft, a mounting support on the winder, said mounting support having a pocket therein, an inert mass mounted in the pocket, said pocket being open at one side, said mass moving to lock the winder shaft when the vehicle accelerates in at least one of the three directions in space, the mounting support comprising a ring mount having an adjusting cylinder arranged therein so that the adjusting cylinder can selectively be rotated about its longitudinal axis, the ring mount being selectively rotatable about an axis perpendicular to the longitudinal axis of the adjusting cyclinder.

2. A winder according to claim 1, wherein said ring mount has two adjusting cylinders arranged therein to be rotated and arrested in axial alignment with one another.

3. A winder according to claim 1, wherein the inert mass is a ball.

4. A winder according to claim 1, wherein the inert mass is a body which is rounded at one side and preferably provided with a projection at the side opposite the rounded part.

5. A winder according to claim 4, wherein the inert member has an opening in its underside to receive a ball.

6. A winder according to claim 1, wherein the inert mass is a pendulum.

7. A winder according to claim 1, wherein the inert mass is a carriage mounted on rollers.

8. A winder according to claim 7, wherein the carriage is provided at the top with a funnel-shaped opening and said locking mechanism includes a locking lever having a locking pin mounted thereon, the locking pin being displaceable relative to the opening, and the locking lever being pivoted about an axis perpendicular to the axis of the adjusting cylinder.

9. A winder according to claim 1, wherein the winding shaft has a locking wheel mounted thereon, the locking wheel having teeth at the periphery engageable by the locking mechanism.

10. A winder according to claim 1, wherein the pocket in the adjusting cylinder is substantially arcuate in one plane.

11. A winder according to claim 1, wherein the bottom of the pocket is trough-shaped.

12. A winder according to claim 1, wherein the bottom of the pocket is resilient.

13. A winder according to claim 1, wherein the adjusting cylinder is made of pressure-resistant, resilient material.

14. A winder according to claim 1, wherein the adjusting cylinder has a slot therein for adjusting the position thereof in the mounting support.

15. A winder according to claim 1, wherein said adjusting cylinder has a bottom and said locking mechanism includes a trap having said inert mass arranged therein, said trap including a hinge connected to the adjusting cylinder externally at the bottom and comprising two side surfaces substantially at right angles to one another, one of said surfaces being an outer surface and having a free end adapted to lock the winder shaft, and a projection composed of hardened metal provided at the free end of the outer side surface of the trap.

* * * * *

UNITED STATES PATENT OFFICE
CERTIFICATE OF CORRECTION

Patent No. 4,004,751           Dated January 25, 1977

Inventor(s) Per Olof Weman and Harald Martin Schmelow

It is certified that error appears in the above-identified patent and that said Letters Patent are hereby corrected as shown below:

Cover page, in the title, "BACKING" should read --LOCKING--.

in the Inventors names, "Olaf" should read --Olof--.

Column 1, line 2, "BACKING" should read --LOCKING--.

line 23, after "member" insert --,--.

line 65, "5°" should read --5--.

line 67, after "winder" insert --,--.

Column 4, line 61, "per se" should read --*per se*--.

Column 6, line 32, after "because" insert --different--.

Column 11, line 50, after "carriage" insert --21--.

Column 14, line 2, after "therein" delete all that follows and insert --the trap being hinged to the adjusting cylinder externally at the bottom and comprising two side surfaces substantially at right angles to one another, one of said surfaces being an outer surface and having a free end adapted to lock

UNITED STATES PATENT OFFICE
CERTIFICATE OF CORRECTION

Patent No. 4,004,751   Dated January 25, 1977

Inventor(s) Per Olof Weman and Harald Martin Schmelow

It is certified that error appears in the above-identified patent and that said Letters Patent are hereby corrected as shown below:

the winder shaft, and a projection of hardened metal provided at the free end of the outer side surface of the trap.

Signed and Sealed this

First Day of December 1981

[SEAL]

Attest:

*Attesting Officer*

GERALD J. MOSSINGHOFF
*Commissioner of Patents and Trademarks*